(12) United States Patent
Zamora et al.

(10) Patent No.: US 8,851,174 B2
(45) Date of Patent: Oct. 7, 2014

(54) FOAM RESIN SEALANT FOR ZONAL ISOLATION AND METHODS FOR MAKING AND USING SAME

(75) Inventors: Frank Zamora, San Antonio, TX (US); Sarkis R. Kakadjian, San Antonio, TX (US); Tina Garza, San Antonio, TX (US)

(73) Assignee: Clearwater International LLC, Houston, TX (US)

( * ) Notice: Subject to any disclaimer, the term of this patent is extended or adjusted under 35 U.S.C. 154(b) by 0 days.

(21) Appl. No.: 13/053,975

(22) Filed: Mar. 22, 2011

(65) Prior Publication Data

US 2011/0284248 A1 Nov. 24, 2011

Related U.S. Application Data

(63) Continuation-in-part of application No. 12/784,479, filed on May 20, 2010.

(51) Int. Cl.

| | |
|---|---|
| *E21B 33/12* | (2006.01) |
| *C09K 8/00* | (2006.01) |
| *C09K 8/42* | (2006.01) |
| *C09K 8/44* | (2006.01) |
| *E21B 33/13* | (2006.01) |

(52) U.S. Cl.
CPC . *E21B 33/13* (2013.01); *C09K 8/42* (2013.01); *C09K 8/44* (2013.01)
USPC .............................. 166/295; 166/285; 507/219

(58) Field of Classification Search
None
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |

(Continued)

FOREIGN PATENT DOCUMENTS

CA  2514492 A1  9/2004

OTHER PUBLICATIONS

U.S. Appl. No. 13/117,304, filed May 27, 2011, Falana et al.
U.S. Appl. No. 13/247,985, filed Sep. 28, 2011, Veldman et al.

(Continued)

*Primary Examiner* — Zakiya W Bates
*Assistant Examiner* — Silvana Runyan
(74) *Attorney, Agent, or Firm* — Robert W Strozier

(57) ABSTRACT

Foamable epoxy-based zonal isolation sealing compositions include epoxy resin and a blowing agent and methods for isolating zones in borehole of oil and gas wells using the compositions, where the foam nature of the cured seals provide sufficient compressibility and resiliency to be used with expandable tubing without substantial loss in sealant integrity and in squeeze operations.

16 Claims, 5 Drawing Sheets

(56) References Cited

U.S. PATENT DOCUMENTS

| | | | |
|---|---|---|---|
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/201 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffee et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,875,844 A * | 3/1999 | Chatterji et al. | 166/293 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,969,006 A * | 10/1999 | Onan et al. | 523/166 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,302,207 B1 * | 10/2001 | Nguyen et al. | 166/276 |
| 6,330,916 B1 | 12/2001 | Rickards et al. | 166/280.2 |
| 6,403,669 B1 * | 6/2002 | Camberlin et al. | 521/178 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,858,566 B1 * | 2/2005 | Reddy et al. | 507/202 |
| 6,875,728 B2 | 4/2005 | Gupta et al. | 507/240 |
| 7,140,433 B2 | 11/2006 | Gatlin et al. | 166/250.1 |
| 7,268,100 B2 | 9/2007 | Kippie et al. | 507/244 |
| 7,350,579 B2 | 4/2008 | Gatlin et al. | 166/308.3 |
| 7,392,847 B2 | 7/2008 | Gatlin et al. | 166/280.2 |
| 7,517,447 B2 | 4/2009 | Gatlin | 208/236 |
| 7,565,933 B2 | 7/2009 | Kippie et al. | 166/372 |
| 7,566,686 B2 | 7/2009 | Kippie et al. | 507/213 |
| 7,712,535 B2 | 5/2010 | Venditto et al. | 166/308.2 |
| 7,723,273 B1 * | 5/2010 | Zaid et al. | 507/219 |
| 7,767,628 B2 | 8/2010 | Kippie et al. | 507/102 |
| 7,829,510 B2 | 11/2010 | Gatlin et al. | 507/277 |
| 7,886,824 B2 | 2/2011 | Kakadjian et al. | 166/308.2 |
| 7,915,203 B2 | 3/2011 | Falana et al. | 507/136 |
| 7,932,214 B2 | 4/2011 | Zamora et al. | 507/202 |
| 7,942,201 B2 | 5/2011 | Ekstrand et al. | 133/246 |
| 7,956,017 B2 | 6/2011 | Gatlin et al. | 166/280.2 |
| 7,956,217 B2 | 6/2011 | Falana et al. | 562/572 |
| 7,971,659 B2 | 7/2011 | Gatlin et al. | 510/492 |
| 7,989,404 B2 | 8/2011 | Kakadjian et al. | 507/261 |
| 7,992,653 B2 | 8/2011 | Zamora et al. | 175/65 |
| 8,011,431 B2 | 9/2011 | van Petegen | 166/270 |
| 8,012,913 B2 | 9/2011 | Gatlin et al. | 507/239 |
| 8,028,755 B2 | 10/2011 | Darnell et al. | 166/379 |
| 8,034,750 B2 | 10/2011 | Thompson et al. | 507/273 |
| 8,065,905 B2 | 11/2011 | Sweeney et al. | 73/49.1 |
| 8,084,401 B2 | 12/2011 | Lukocs et al. | 507/238 |
| 8,093,431 B2 | 1/2012 | Falana et al. | 564/471 |
| 8,097,567 B2 | 1/2012 | Wilson, Jr. | 507/131 |

(56) References Cited

U.S. PATENT DOCUMENTS

| | | | |
|---|---|---|---|
| 8,099,997 B2 | 1/2012 | Curr et al. | 73/49.5 |
| 8,141,661 B2 | 3/2012 | Kakadjian et al. | 175/69 |
| 8,158,562 B2 | 4/2012 | Wilson, Jr. et al. | 507/203 |
| 8,172,952 B2 | 5/2012 | Wanner et al. | 134/22.11 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2006/0194700 A1 | 8/2006 | Gatlin et al. | 507/203 |
| 2008/0105429 A1* | 5/2008 | Phipps et al. | 166/295 |
| 2008/0251252 A1 | 10/2008 | Schwartz | 507/238 |
| 2008/0318812 A1 | 12/2008 | Kakadjian et al. | 507/219 |
| 2009/0250659 A1 | 10/2009 | Gatlin | 208/236 |
| 2009/0275488 A1 | 11/2009 | Zamora et al. | 507/236 |
| 2010/0077938 A1 | 4/2010 | Zamora et al. | 106/677 |
| 2010/0212905 A1 | 8/2010 | van Petegen | 507/236 |
| 2010/0252262 A1 | 10/2010 | Ekstrand et al. | 166/305.1 |
| 2010/0292108 A1 | 11/2010 | Kakadjian | 507/229 |
| 2010/0305010 A1 | 12/2010 | Falana et al. | 507/274 |
| 2010/0311620 A1 | 12/2010 | Kakadjian et al. | 507/266 |
| 2011/0001083 A1 | 1/2011 | Falana et al. | 252/178 |
| 2011/0005756 A1 | 1/2011 | van Petegen et al. | 507/236 |
| 2011/0240131 A1 | 10/2011 | Parker | 137/13 |
| 2011/0247821 A1 | 10/2011 | Thompson et al. | 507/267 |
| 2011/0284247 A1 | 11/2011 | Zamora et al. | 166/295 |
| 2011/0284248 A1 | 11/2011 | Zamora et al. | 166/295 |
| 2012/0071366 A1 | 3/2012 | Falana et al. | 507/202 |
| 2012/0071367 A1 | 3/2012 | Falana et al. | 507/203 |
| 2012/0071370 A1 | 3/2012 | Falana et al. | 507/233 |
| 2012/0073813 A1 | 3/2012 | Zamora et al. | 166/285 |
| 2012/0137752 A1 | 6/2012 | Morrow | 73/49.5 |

OTHER PUBLICATIONS

U.S. Appl. No. 13/109,712, filed May 17, 2011, Falana et al.
U.S. Appl. No. 13/102,053, filed May 6, 2011, Falana et al.
U.S. Appl. No. 13/094,806, filed Apr. 16, 2011, Zamora et al.
U.S. Appl. No. 13/052,947, filed Mar. 21, 2011, Kakadjian et al.
U.S. Appl. No. 13/102,053, filed May 6, 2011, Kakadjian et al.
U.S. Appl. No. 13/348,267, filed Jan. 11, 2012, Kakdjian et al.
U.S. Appl. No. 13/249,819, filed Sep. 30, 2011, Falana et al.
U.S. Appl. No. 13/348,279, filed Jan. 11, 2012, Falana et al.
Canadian Office Action, Jul. 31, 2012.
GB Examination Report, Aug. 7, 2012.

* cited by examiner

FOAM RESIN SEALANT FOR ZONAL ISOLATION AND METHODS FOR MAKING AND USING SAME

RELATED APPLICATIONS

This application is a continuation-in-part of U.S. patent application Ser. No. 12/784,479 filed 20 May 2010 (May 20, 2010) (May 20, 2010).

BACKGROUND OF THE INVENTION

1. Field of the Invention

Embodiments of the present invention relate to methods and systems for zonal isolation, where a zone isolation composition is pumped into an annulus between a borehole and a tubular member allowed to set to form a foamed isolation seal, where the seal has a compressibility sufficient for expandable tubing to be expanded without loss in seal integrity. The cured compositions are ideally suited for use with expansion tubing, where the zonal isolation composition must be compressible, while continuing to isolate the zones.

More particularly, embodiments of the present invention relate to methods and systems for zonal isolation, where the zone isolation composition is pumped into an annulus between a borehole and a tubular member allowed to test to form a foamed isolation seal, where the seal has a compressibility sufficient for expandable tubing to be expanded without loss in seal integrity. The composition includes epoxy resins, hardening agents and blowing agents in the presence or absence of solvent or solubilizing agents. The invention contemplates different combinations of the resins, the hardening agents, the blowing agents and optional the solubilizing agents for different temperature applications. A low temperature zonal isolation composition sets at a low temperature range. A moderate temperature isolation composition sets at a moderate temperature range. A temperature isolation composition sets at a high temperature range. All of the compositions cure to form a compressible zonal isolation, epoxy foam seal capable of use in any application where compressibility is need such as with expansion tubing.

2. Description of the Related Art

Conventional sealants for zonal isolation are cements, foam fluids or resins. In expandable tubing applications, the zonal isolation sealant must be able to compress and to continue to seal after the sealant is pumped behind the pipe and set. Conventional zone isolation systems do not offer the compressible and/or resilient properties necessary to permit expandable pipe to expand without fracturing the system due to their hardness obviating zonal isolation. Using such compositions requires that the expandable pipe must expanded prior to the sealant setting. This requires retarding the setting of the sealant for a time sufficient to permit the expandable pipe to be expanded prior to sealant setting. Once the tubing is expanded, the sealant sets. Problems arise when expansion of expandable tubing cannot occur within the retarding window for once the sealant sets, the expandable tubing cannot be expanded due the incompressibility of the cured sealant.

Thus, there is a need in the art for a sealant that is compressible and/or resilient permitting expandable tubing to be expanded before, during and/or after sealant curing. The solution to these problems is a sealant that is compressible and/or resilient enough to allow expansion of the expandable pipe before, during or after the material has harden, while maintaining a effective zonal isolation seal.

SUMMARY OF THE INVENTION

Embodiments of the present invention provide methods and systems for zonal isolation, where the zonal isolation compositions are pumped into an annulus between a borehole and a tubular member allowed to set and form a foam isolation seal, where the seal has resiliency and/or compressibility properties sufficient to sustain the casing and to permit expansion of the tubing without substantial loss in seal integrity. Embodiments of the present invention also provide methods and systems for squeeze jobs, where a composition of this invention is squeezed or pumped into a zone to form an in situ tight foam seal having desired resiliency and/or compressibility properties, where the foam composition expands into cavities and crevices and continuous to expand after curing. Embodiments of the compositions of this invention include a epoxy resin, a hardening agent, a blowing agent and optionally a solvent or solubilizing agent, where the foam composition expands into cavities and crevices and continuous to expand after curing. The blowing agents generate gases at a desired decomposition temperature to in situ create open celled and/or closed celled foams, where the cured composition has a Poisson ratio of less than about 0.5.

Embodiments of the present invention provide foamable epoxy zonal isolation sealing compositions including one epoxy resin or a plurality of epoxy resins, one hardening agent or a plurality of hardening agents, one blowing agent or a plurality of blowing agents and optionally a diluent, solvent, solubilizing system, where the compositions cure to form epoxy foam zonal isolation structures or seals having sufficient compressibility and/or resiliency properties to permit compression of the structures or seals without substantial loss in seal integrity or zonal isolation. In certain embodiments, the compressibility is sufficient to allow expansion of expansion tubing pipe during or especially after setting or curing and blowing to form the foamed seals. The sealing compositions are designed to have sufficient strength and bonding characteristics so that the liner, expandable tubing or other tubing inserted into the borehole is held in place in the borehole. After setting, the borehole is sealed so that there is substantially no migration of fluids from one zone to another zone.

Embodiments of the present invention provide epoxy foamable resin systems having desired mechanical properties, while having improved compressibility and/or resiliency properties.

Embodiments of the present invention provide foamable sealant compositions for use as squeeze materials to shut off annular gas and/or liquid migration and/or to isolate zones during primary casing or liner top isolation. The sealant compositions are unique because the mechanical properties are set to allow the compositions to be ductile and offer long term isolation. The sealant compositions are also foams, which have greater compressibility and/or resiliency properties and better flow properties during curing and foaming so that the compositions form superior seals by intruding into surface cavities and crevices of the borehole, while adhering to the outer surface of the lining tube or casing. Due to the foam nature of the sealing compositions, the compositions have a Poisson ratio of less than or equal to about 0.5. Moreover, the epoxy foam sealants of this invention continue to expand after setting allowing the compositions to intrude more deeply into formations and provide improved sealing and long terms sealing integrity. This continued expansion operates to ensure effective zonal isolation even after expansion of expandable tubing or after settling of the tubular members into their final configuration without adversely affecting sealant properties.

Embodiments of the present invention provide methods for zonal isolation including inserting a tubing into a borehole. After tubing placement, pumping a composition of this invention into an annulus between the wall of the borehole and an outer wall of the tubing. Allowing sufficient time for the composition to cure and foam to form a foamed seal sealing the annulus. The compositions may be pumped in parts, the resins, the blowing agents and the hardening agents all may be pumped separately downhole and mixed in a static mixing chamber downhole prior to or as the components are being pumped into the annulus. In the case of expansion tubing, the methods may also include expanding the tubing, where the expansion of the tubing results in a compression of the foam seals. where the seals maintain isolation after expansion. The expansion may be performed after curing and/or during curing. In certain embodiments, the expansion is performed during curing and foam formation.

Embodiments of the present invention provide methods for squeeze operations including pumping the composition into annulus or a region thereof, where fluid (gas, liquid, or mixtures thereof) migration is occurring, to form a seal to reduce or eliminate such migration. The methods may also include isolating the region or regions so that the composition locally reduces or prevents fluid (gas, liquid, or mixture thereof) migration. The methods may also include maintaining isolation until the composition is fully cured and foamed.

Embodiments of the present invention provide methods for zone isolation including pumping foamable epoxy-based compositions into an annulus between a borehole and a tubing string. The compositions are then allowed to cure to form foam zonal isolation structures or seals comprising the cured foamed compositions of this invention. The cured/foamed seals cure at a temperature range between about 50° and about 300° F. and the blowing agents are selected to decompose at the curing temperature. The methods may also include prior to pumping, isolating a section of an annulus between the borehole and the tubing string so that the zonal isolation structure is localized along a length of the tubing string. The methods may also include during or after curing, expanding a section of the tubing string, where the compressibility of the cured and foamed seals are sufficient to allow expansion of expandable tubing without a substantial loss in seal integrity or zonal isolation. The zonal isolation structure may also be located at a distal end of the borehole. The foamable compositions comprise one epoxy resin or a plurality of epoxy resins, one blowing agent or a plurality of blowing agents, one hardening agent or a plurality of hardening agents and optionally a diluent, solubilizing or solvent system, where the compositions cure and blowing agents decompose to form a cured foamed epoxy sealing composition having sufficient compressibility and/or resiliency properties to permit compression of the composition without substantial loss in seal integrity or zonal isolation.

BRIEF DESCRIPTION OF THE DRAWINGS

The invention can be better understood with reference to the following detailed description together with the appended illustrative drawings in which like elements are numbered the same.

DEFINITIONS OF THE INVENTION

Figures 1A, 1B, 1C, 1D:
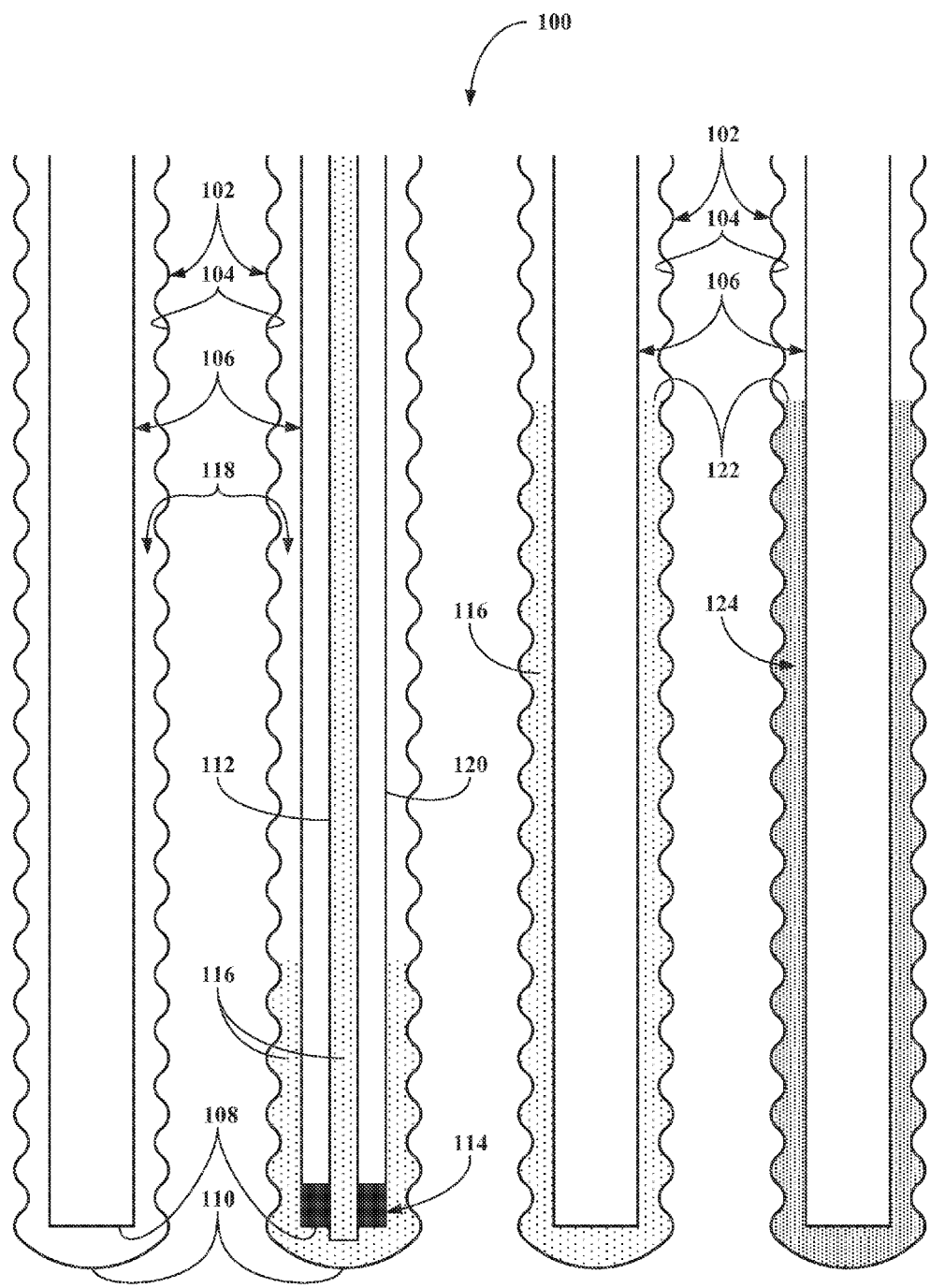
FIG. 1A depicts an annulus between a borehole and a tubing inserted into the borehole.
FIG. 1B depicts the annulus of FIG. 1A having an sealant supply conduit inserted into the borehole with a packer to prevent the sealant from filling the casing showing the annulus being filled with an epoxy zonal isolation or sealant composition of this invention.
FIG. 1C depicts the annulus of FIG. 1A after a zone of the borehole has been filled with the epoxy zonal isolation composition.
FIG. 1D depicts the zone of the annulus of FIG. 1A filled with a compressible, cured epoxy zonal isolation composition after curing.
Figures 2A, 2B, 2C, 2D:
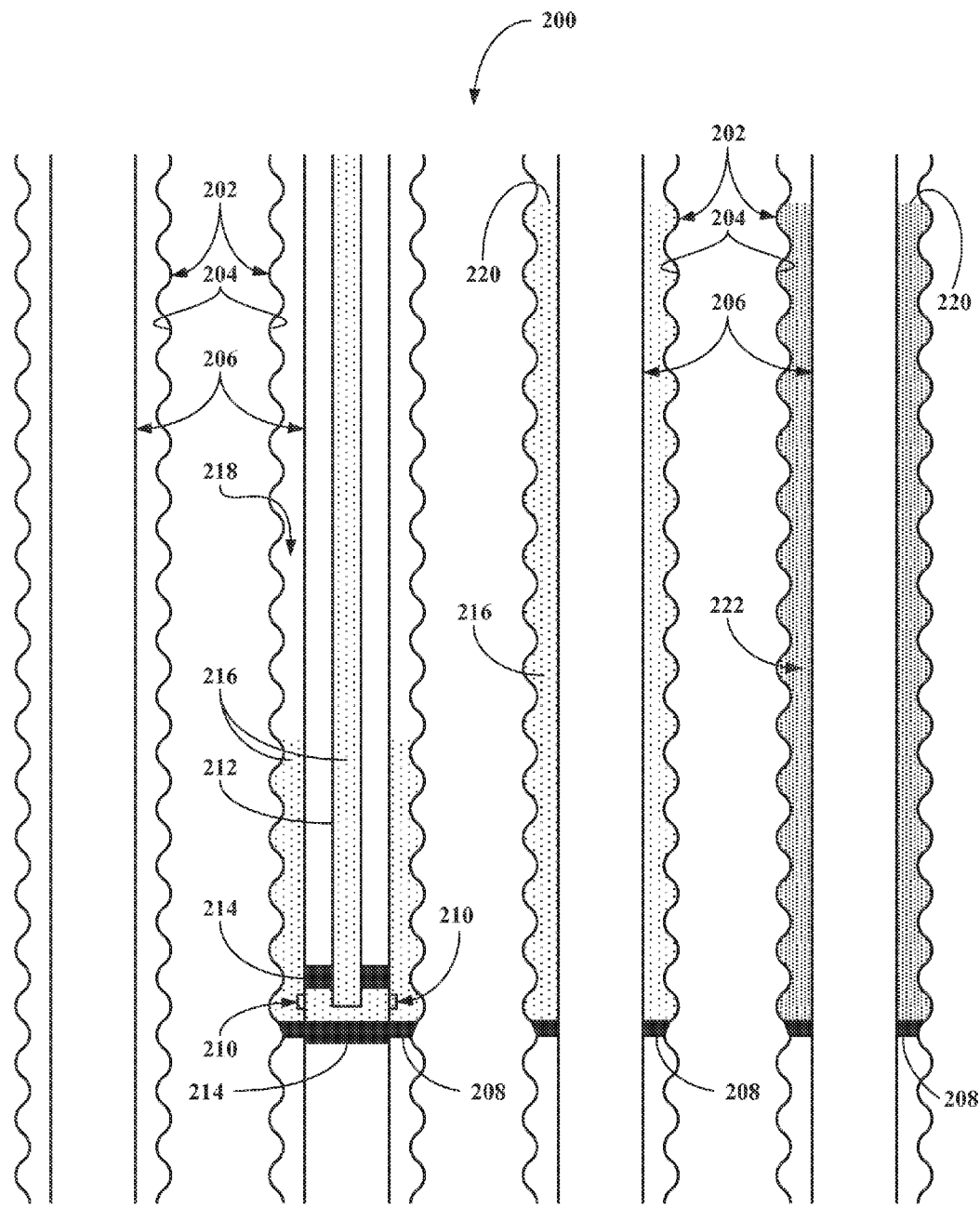
FIG. 2A depicts an annulus between a borehole and a tubing inserted into the borehole.
FIG. 2B depicts the annulus of FIG. 2A having an sealant supply conduit inserted into the borehole with packers and an isolation member to isolate a section of the annulus showing the section being filled with an epoxy zonal isolation or sealant composition of this invention.
FIG. 2C depicts the annulus of FIG. 2A after the section has been filled with the epoxy zonal isolation composition.
FIG. 2D depicts the zone of the annulus of FIG. 2A filled with a compressible, cured epoxy zonal isolation composition after curing.

The term substantially no migration of fluids means that there is less than or equal to 5% fluid migration from one sone to another zone. In other embodiments, the term means that there is less than or equal to 2.5% fluid migration from one sone to another zone. In other embodiments, the term means that there is less than or equal to 1% fluid migration from one sone to another zone. In other embodiments, the term means that there is no fluid migration from one sone to another zone.

The term without substantial loss of seal integrity means that the seal integrity after compression is at least 75% of the seal integrity before compression. In other embodiments, the term means that the seal integrity after compression with is at least 80% of the seal integrity before compression. In other embodiments, the term means that the seal integrity after compression with is at least 85% of the seal integrity before compression. In other embodiments, the term means that the seal integrity after compression with is at least 90% of the seal integrity before compression. In other embodiments, the term means that the seal integrity after compression with is at least 95% of the seal integrity before compression. In other embodiments, the term means that the seal integrity after compression with is at least 99% of the seal integrity before compression. In other embodiments, the term means that the seal integrity after compression with is equal to the seal integrity before compression.

The term "gpt" means gallons per thousand gallons.
The term "gptg" means gallons per thousand gallons.
The term "pptg" means pounds per thousand gallons.
The term "wt. %" means weight percent.
The term "w/w" means weight per weight.

DETAILED DESCRIPTION OF THE INVENTION

The inventors have found that thermal setting epoxy based resin systems can be used as a zone isolation sealant in downhole zone isolation operations. The epoxy based resin systems cure and foam at an elevated temperature to form foam zonal isolation structures or seals having a compressibility sufficient for use in expansion tubing, squeeze or other operations requiring a compressible and resilient seal. During tubing expansion, the cured and foamed sealing compositions compress without substantial loss in seal integrity. The inventors have also found that the compositions may be pumped into an annulus between the wellbore and the expansion tubing, and the tubing expanded while the compositions are curing. The compositions of this invention are designed to cure and foam after the compositions have been pumped into a zone, where isolation is required or desired. In certain embodiments, the hardening or curing agents and blowing agents have delayed cure on-set. In other embodiments, the curing agents and the blowing agents are added to the resins downhole, just prior to the compositions being pumped into the zone. In these latter embodiments, the resins and hardening or curing agents may pass through a static mixer, mechanical mixer, electromechanical mixer or other type of mixers to insure adequate dispersal of the hardening or curing agents in the resin. In certain embodiments, the curing agents and blowing agents are temperature sensitive so that curing and blowing occur only when the composition achieves a given elevated temperature.

Embodiments of the present invention broadly relate to foamable epoxy-based zonal isolation compositions including one epoxy resin or a plurality of epoxy resins, one curing agent or a plurality of curing agents, and one blowing agent or a plurality of blowing agents, and optionally a solvent system in the present or absence of a diluent or solvent system. The compositions cure and foam to form a cured and foamed epoxy-based zonal isolation seals or structures having sufficient compressibility and/or resilience properties to permit compression of the composition without substantial loss in seal integrity or zonal isolation. In certain embodiments, the compressibility is sufficient to allow expansion of expansion tubing pipe during or especially after hardening or curing of the composition. The sealant compositions are designed to have sufficient strength and bonding characteristics so that the liner, expandable tubing or other tubing inserted into the borehole is held in place in the borehole and the borehole is sealed so that there is no migration of fluids from one zone to another zone. In certain embodiments, the compositions of this invention are low temperature, foamable zonal isolation compositions, which set and foam at a low temperature range between about 50° F. and about 90° F. In other embodiments, the compositions of this invention are moderate temperature, foamable zonal isolation compositions, which set at a moderate temperature range between about 90° F. and about 150° F. In certain embodiments, the compositions of this invention are high temperature, foamable zonal isolation compositions, which set at a high temperature range between about 150° F. to about 300° F. All of the compositions cure and foam to form compressible zonal isolation, epoxy foam seals capable of use in any application, where compressibility and/or resiliency properties are needed or desired such as with expansion tubing operations and squeeze operations.

High Temperature Compositions

Embodiments of the present invention specifically relate to high-temperature, foamble epoxy-based zonal isolation compositions including one epoxy resin or a plurality of epoxy resins, one curing agent or a plurality of curing agents, and one blowing agent or a plurality of blowing agents in the present or absence of a diluent or solvent system. The composition is designed to thermally set at temperature between about 150° F. to about 300° F.

In certain embodiments, the high-temperature foamable zonal isolation compositions include from about 60 wt. % to about 85 wt. % of an epoxy resin or mixture of epoxy resins, from about 1 wt. % to about 15 wt. % of a curing agent or mixture of curing agents, from about 5 wt. % to about 15 wt. % of a blowing agent or mixture of blowing agents and optionally from about 0 wt. % to about 39 wt. % of a diluent or solvent system, based on the weight of the other components. The diluent or solvent system is used to reduce the viscosity of the composition.

In other embodiments, the high-temperature foamable zonal isolation compositions include from about 65 wt. % to about 85 wt. % of an epoxy resin or mixture of epoxy resins, from about 5 wt. % to about 10 wt. % of a curing agent or mixture of curing agents, from about 5 wt. % to about 15 wt. % of a blowing agent or mixture of blowing agents and from about 5 wt. % to about 30 wt. % of a diluent or solvent system, based on the weight of the other components.

In other embodiments, the high-temperature zonal isolation composition includes from about 75 wt. % to about 85 wt. % of an epoxy resin or mixture of epoxy resins, from about 5 wt. % to about 10 wt. % of curing agent or mixture of curing agents, from about 5 wt. % to about 15 wt. % of a blowing agent or mixture of blowing agents and from about 5 wt. % to about 20 wt. % of a diluent or solvent system, based on the weight of the other components.

In other embodiments, the high-temperature zonal isolation composition includes from about 80 wt. % to about 85 wt. % of an epoxy resin or mixture of epoxy resins, from about 5 wt. % to about 10 wt. % of a curing agents, from about 5 wt. % to about 15 wt. % a blowing agent or mixture of blowing agents, and from about 5 wt. % to about 15 wt. % of a diluent or solvent system based on the weight of the other components.

In certain embodiments, the epoxy resin is a glycidyl ethers epoxy resin or mixture of glycidyl ethers epoxy resins, the curing agent is an alkoxylated polyamine or mixture of alkoxylated polyamines and the diluent is an aromatic heterocyclic solvent or mixture of aromatic heterocyclic solvents.

In other embodiments, the epoxy resin is DURA COATT™ 1A available from JACAM Chemicals, LLC, of Sterling, Kans., the curing agent is DURA COAT™ 2B available from JACAM Chemicals, LLC, of Sterling, Kans. and the diluent is AKOLIDINE™ 11 available from Lonza Group Ltd, Joseph Colleluori, Muenchensteinerstrasse 38, CH-4002 Basel, Switzerland.

Mid Temperature Compositions

Embodiments of the present invention specifically relate to mid-temperature, foamable epoxy-based zonal isolation compositions including one epoxy resin or a plurality of epoxy resins, one curing agent or a plurality of curing agents, and one blowing agent or a plurality of blowing agents in the present or absence of a diluent or solvent system. The compositions are designed to thermally set at temperature between about 90° F. and about 150° F.

In certain embodiments, the mid-temperature, foamable zonal isolation compositions include from about 70 wt. % to about 50 wt. % of an epoxy resin or mixture of epoxy resins, from about 30 wt. % to about 50 wt. % of a hardening or curing agent or a mixture of curing agents and from about 5 wt. % to about 15 wt. % a blowing agent or mixture of blowing agents based on the weight of the other components.

In other embodiments, the mid-temperature zonal isolation composition includes from about 60 wt. % to about 50 wt. % of an epoxy resin or mixture of epoxy resins, from about 40 wt. % to about 50 wt. % of a hardening or curing agent or a mixture of curing agents and from about 5 wt. % to about 15 wt. % a blowing agent or mixture of blowing agents based on the weight of the other components.

In other embodiments, the mid-temperature zonal isolation composition includes from about 55 wt. % to about 50 wt. % of an epoxy resin or mixture of epoxy resins and from about 45 wt. % to about 50 wt. % of a hardening or curing agent or a mixture of curing agents and from about 5 wt. % to about 15 wt. % a blowing agent or mixture of blowing agents based on the weight of the other components. The mid-temperature zonal isolation compositions may be diluted with up to about 20 wt. % of a diluent or solvent, where the diluent or solvent is used to reduce the viscosity of the composition.

In other embodiments, the epoxy resin is glycidyl ethers epoxy resin or mixture of glycidyl ethers epoxy resins and the curing agent is a heterocyclic amine.

In certain embodiments, the epoxy resin is DURA COATT™ 1A available from JACAM Chemicals, LLC, of Sterling, Kans., and the curing agent is a imidazoline or mixture or imidazolines.

Low Temperature Compositions

Embodiments of the present invention specifically relate to low-temperature epoxy-based zonal isolation compositions including one epoxy resin or a plurality of epoxy resins, one curing agent or a plurality of curing agents, and one blowing agent or a plurality of blowing agents in the present or absence of a diluent or solvent system. The composition is designed to thermally set at temperature between about 50° F. and about 90° F.

In certain embodiments, the low-temperature zonal isolation composition includes from about 75 wt. % to about 99 wt. % of an epoxy resin or a mixture of epoxy resins, from about 25 wt. % to about 1 wt. % of a hardening or curing agent or a mixture of curing agents and from about 5 wt. % to about 20 wt. % the blowing agents based on the weight of the other components.

In other embodiments, the low-temperature zonal isolation composition includes from about 85 wt. % to about 97.5 wt. % of an epoxy resin or a mixture of epoxy resins, from about 15 wt. % to about 2.5 wt. % of a curing agent or a mixture of curing agents and from about 5 wt. % to about 20 wt. % the blowing agents based on the weight of the other components.

In other embodiments, the low-temperature zonal isolation composition includes from about 90 wt. % to about 95 wt. % of an epoxy resin or mixture of epoxy resins, from about 10 wt. % to about 5 wt. % of a curing agent or a mixture of curing agents, and from about 5 wt. % to about 20 wt. % a blowing agent or mixture of blowing agents based on the weight of the other components. The low-temperature zonal isolation compositions may be diluted with up to about 20 wt. % of a diluent or solvent, where the diluent or solvent is used to reduce the viscosity of the composition.

In other embodiments, the epoxy resin is glycidyl ethers epoxy resin or mixture of glycidyl ethers epoxy resins and the curing agent is a heterocyclic amine.

In certain embodiments, the epoxy resin is DURA COATT™ 1A available from JACAM Chemicals, LLC, of Sterling, Kans., and the curing agent is a imidazoline, pyrrolidine, pyrrole, pyridine, piperidine or mixtures thereof.

Methods

Embodiments of the present invention also broadly relates to methods for zonal isolation including inserting a tubing into a borehole. After tubing placement, pumping a foamabloe composition of this invention into an annulus between the wall of the borehole and an outer wall of the tubing. The methods also include allowing sufficient time for the compositions to cure and foam sealing the annulus. The compositions may be pumped in parts. In certain embodiments, the resins and the blowing agents and the hardening or curing agents may be pumped separately downhole and mixed in a static mixing chamber downhole prior to being pumped into the annulus. In other embodiments, the resins and the hardening or curing agents and the blowing agent pumped separately downhole and mixed in a static mixing chamber downhole prior to being pumped into the annulus.

Embodiments of the present invention also provide methods for squeeze operations including pumping a composition of this invention into annular spaces, regions or locations in a complete well, where fluid migration is occurring to form a seal to reduce or eliminate such migration.

In certain embodiments, the diluent system comprises aromatic solvents and heterocyclic aromatic solvents or mixtures and combinations thereof.

The epoxy resins may comprise: (a) glycidyl ethers epoxy resin prepared by the reaction of epichlorohydrin with a compound containing a hydroxyl group carried out under alkaline reaction conditions; (b) epoxy resins prepared by the reaction of epichlorohydrin with mononuclear di- and tri-hydroxy phenolic compounds; (c) epoxidized derivatives of natural oils with mixed long-chain saturated and unsaturated acids having between about 14 and 20 carbon atoms; (d) polyepoxides derived from esters of polycarboxylic acids with unsaturated alcohols; (e) polyepoxides derived from esters prepared from unsaturated alcohols and unsaturated carboxylic acids; (f) epoxidized butadiene based polymers; (g) epoxidized derivatives of dimers of dienes, and (h) mixtures or combinations thereof. The epoxy resins may have a molecular weight between about 50 and about 10,000.

The curing agents may comprise polyamine curing agents, alkoxylated polyamine curing agents, heterocylic amine curing agents, or similar compounds including a plurality of amino groups, or mixtures and combinations thereof. The curing agents may comprise alkoxylated aliphatic polyamines, alkoxylated cycloaliphatic polyamines, alkoxylated aromatic polyamines, alkoxylated heterocyclic polyamines or mixtures and combinations thereof.

In certain embodiments, the temperature range is between about 150° F. to about 300° F. and the composition comprises from about 60 wt. % to about 85 wt. % of an epoxy resin or a mixture of epoxy resins, from about 1 wt. % to about 15 wt. % of a curing agent or a mixture of curing agents, and from about 5 wt. % to about 15 wt. % the blowing agent a mixture or blowing agents and from about 39 wt. % to about 0 wt. % of a diluent or solvent, based on the weight of the other components, where the diluent or solvent is used to reduce the viscosity of the composition. The epoxy resins are glycidyl ethers epoxy resins or mixture of glycidyl ethers epoxy resins, the curing agent is an alkoxylated polyamine or mixture of alkoxylated polyamines and the diluent is an aromatic heterocyclic solvent or mixture of aromatic heterocyclic solvents. The epoxy resin is DURA COAT™ 1A available from JACAM Chemicals, LLC, of Sterling, Kans., the curing agent is DURA COAT 2B and the diluent is AKOLIDINE™11 available from Lonza Group Ltd, Joseph Colleluori, Muenchensteinerstrasse 38, CH-4002 Basel, Switzerland.

In certain embodiments the temperature range is between about 90° F. and about 150° F. and the composition comprises from about 70 wt. % to about 50 wt. % of an epoxy resin or a mixture of epoxy resins, from about 30 wt. % to about 50 wt. % of a hardening or curing agents or a mixture of curing agents and from about 5 wt. % to about 20 wt. % a blowing agent or a mixture of blowing agents based on the weight of the other components. The epoxy resins may be glycidyl ethers epoxy resin or mixture of glycidyl ethers epoxy resins and the curing agent may be a heterocyclic amine. The epoxy resin may be DURA COAT™ 1A available from JACAM Chemicals, LLC, of Sterling, Kans. and the curing agent may be a imidazoline or mixture or imidazolines.

In certain embodiments the temperature range is between about 50° F. and about 90° F. and the composition comprises from about 75 wt. % to about 99 wt. % of an epoxy resin or a mixture of epoxy resins, from about 25 wt. % to about 1 wt. % of a hardening or curing agent or a mixture of curing agents, and from about 5 wt. % to about 15 wt. % a blowing agent or a mixture of blowing agents based on the weight of the other components. The epoxy resins may be glycidyl ethers epoxy resin or mixture of glycidyl ethers epoxy resins and the curing agent is a imidazoline, pyrrolidine, pyrrole, pyridine, piperidine or mixtures thereof. The epoxy resin may be DURA COAT™ 1A available from JACAM Chemicals, LLC, of Sterling, Kans. and the curing agent maybe a imidazoline, pyrrolidine, pyrrole, pyridine, piperidine or mixtures thereof.

In certain embodiments the composition comprises from about 60 wt. % to about 85 wt. % of a epoxy resin or a mixture of epoxy resins, from about 1 wt. % to about 15 wt. % of a hardening or curing agent or a mixture of curing agents, from about 5 wt. % to about 15 wt. % a blowing agent or a mixture of blowing agents and from about 39 wt. % to about 0 wt. % of a solvent system, based on the weight of the other components.

Suitable Materials for Use in the Invention

Suitable epoxy resin include, without limitation, (a) glycidyl ethers epoxy resin prepared by the reaction of epichlorohydrin with a compound containing a hydroxyl group (e.g., bisphenol A) carried out under alkaline reaction conditions; (b) epoxy resins prepared by the reaction of epichlorohydrin with mononuclear di- and tri-hydroxy phenolic compounds such as resorcinol and phloroglucinol, selected polynuclear polyhydroxy phenolic compounds such as bis(p-hydroxyphenyl)methane and 4,4'-dihydroxy biphenyl, or aliphatic polyols such as 1,4-butanediol and glycerol; (c) epoxidized derivatives of natural oils such as the triesters of glycerol with mixed long-chain saturated and unsaturated acids having between about 14 and 20 carbon atoms (e.g., 16, 18 and 20 carbon atoms) (soybean oil is a typical triglyceride which can be converted to a polyepoxide); (d) polyepoxides derived from esters of polycarboxylic acids such as maleic acid, terephthalic acid, oxalic acid, succinic acid, azelaic acid, malonic acid, tartaric acid, adipic acid or similar acids, with unsaturated alcohols; (e) polyepoxides derived from esters prepared from unsaturated alcohols and unsaturated carboxylic acids; (f) epoxidized butadiene based polymers such as butadiene-styrene copolymers, polyesters available as derivatives of polyols such as ethylene glycol with unsaturated acid anhydrides such as maleic anhydride and esters of unsaturated polycarboxylic acids; (g) epoxidized derivatives of dimers of dienes such as 4-vinyl cyclohexene-1 from butadiene and dicyclopentadiene from cyclopentadiene, and (h) mixtures or combinations thereof. Epoxy resins suitable for use in the invention have molecular weights generally within the range between about 50 and about 10,000. In other embodiments, the range is between about 2000 and about 1500. In other embodiments, the epoxy resin is commercially available EPON® Resin 828epoxy resin, a registered trademark of Polysciences, Inc. of Warrington, Pa., a reaction product of epichlorohydrin and 2,2-bis(4-hydroxyphenyl) propane (bisphenol A) and having a molecular weight of about 400, an epoxide equivalent (ASTM D-1652) of about 185-192. Exemplary examples of some epoxy resins include, without limitation: epoxidized esters of 2,3-epoxypentyl-3, 4-epoxybutyrate; 2,3-epoxybutyl-3,4-epoxyhexanoate; 3,4-epoxyoctyl-2,3-epoxycyclohexane carboxylate; 2,3-epoxydodecyl-4,5-epoxyoctanoate; 2,3-epoxyisobutyl-4,5-epoxydodecanoate; 2,3-epoxycyclododedcyl-3,4-epoxypentanoate; 3,4-epoxyoctyl-2,3-epoxycyclododecane carboxylate or similar compounds; and polyepoxides derived from the latter include the following: dimethyl 3,4,7,8-diepoxydecanedioate; dibutyl-3,4,5,6-diepoxycyclohexane-1,2-carboxylate; dioctyl 3,4,7,8-diepoxyhexadecanedioate; diethyl 5,6,9,10-diepoxytetradecanedioate or similar anhydrides. In other embodiments the epoxy resin is DURA COAT™ 1A available from JACAM Chemicals, LLC, of Sterling, Kans. Other epoxy resins are available from JACAM Chemicals, LLC, of Sterling, Kans. or may be found in U.S. Pat. Nos. 5,936,059; 7,557,169; 7,547,373; 7,267,782; 6,943, 219; and 6,277,903.

Suitable curing agents for the epoxy resins include, without limitation, polyamine curing agents, alkoxylatedpolyamine curing agents, heterocylic amine curing agents, or similar compounds including a plurality of amino groups, or mixtures and combinations thereof. Exemplary alkoxylated polyamine curing agents include, without limitation, alkoxylated aliphatic polyamines, alkoxylated cycloaliphatic polyamines, alkoxylated aromatic polyamines, alkoxylated heterocyclic polyamines or mixtures and combinations thereof. In certain embodiments, the alkoxylated polyamines are alkoxylated N-alkyl- and N-alkylenyl-substituted 1,3-diaminopropanes or mixtures and combinations thereof. In other embodiments, the alkoxylated polyamines include alkoxylated N-hexadecyl-1,3-diaminopropane, N-tetradecyl-1,3-diaminopropane, N-octadecyl-1,3-diaminopropane, N-pentadecyl-1,3-diaminopropane, N-heptadecyl-1,3-diaminopropane, N-nonadecyl-1,3-diaminopropane, N-octadecnyl-1,3-diaminopropane or mixtures and combinations thereof. In other embodiments, the alkoxylated polyamines include commercially available mixtures of ethoxylated N-alkylated and N-alkenylated diamines. In other embodiments, the polyamine is a commercial product, ethoxylated N-tallow-1,3-diaminopropane, where the degree of ethoxylation is approximately 10 moles ethoxylate per mole of tallow diamine. In other embodiments the epoxy resin is DURA COAT™ 2B available from JACAM Chemicals, LLC, of Sterling, Kans. Other epoxy curing agents are available from JACAM Chemicals, LLC, of Sterling, Kans. or may be found in U.S. Pat. Nos. 5,936,059; 7,557,169; 7,547,373; 7,267, 782; 6,943,219; and 6,277,903. Exemplary aromatic heterocyclic amine curing agents include, without limitation, pyrrolidine, alkyl pyrrolidines, oxazoline, alkyl oxazolines, triazoles, alkyl triazoles, pyrazolidine, alkyl pyrazolidine, piperidine, alkyl piperidines, piperazine, alkyl piperazines, imidazoline, imidazolidine, alkyl imidazolidines, azepane, alkyl azepane, azepine, alkyl azepines, morpholine, alkyl morpholines, diazapines, alkyl diazapines, or mixtures and combinations thereof. In certain embodiments, the curing agents are a mixture of alkyl pyridines such as AKOLI-DINE™ 11, available from Lonza Group Ltd, Joseph Colleluori, Muenchensteinerstrasse 38, CH-4002 Basel, Switzerland and DURA COAT™ 2B available from JACAM Chemicals, LLC, of Sterling, Kans. In other embodiments, the diluent is pyrrolidine. In other embodiments, the diluent is imodazoline.

Suitable diluent, solubilizing agents or solvent systems for use in the present invention include, without limitation, aromatic solvents and heterocyclic aromatic solvents or mixtures and combinations thereof. Exemplary examples include, without limitation, benzene, toluene, xylene, aromatic oils, aromatic naphtha, pyrrole, alkyl pyrrols, imidazole, alkyl imidazole, pyridine, alkyl pyridines, pyrazole, alkyl pyrazoles, oxazole, alkyl oxazoles, or mixtures and combinations thereof.

Suitable blowing agents for use in the practice of this invention include, without limitation, arylsulphonyl hydrazides including benzene sulphonyl hydrazides, alkylated benzene sulphonyl hydrazides, e.g., 4-methyl benzene sulphonyl hydrazide, and dimeric arylsulphonyl hydrazides including p,p'-oxybis(benzene sulphonyl hydrazide), other similar blowing agents that decompose to generate either nitrogen, carbon dioxide or another inert or substantially inert gas, or mixtures and combinations thereof.

DETAILED DESCRIPTION OF THE DRAWINGS

Referring now to FIGS. 1A-D, an embodiment of a zonal isolation procedure of this invention, generally 100, is shown to include well borehole 102 having a wall 104. Inserted into the borehole 102 is a casing string 106, which has a distal end 108 disposed near a bottom 110 of the well 102. Looking at FIG. 1B, a supply conduit 112 including a packer 114 is inserted into the borehole 102 and an epoxy-based zonal isolation composition 116 of this invention is pumped into the borehole 102 through the conduit 112 and into an annular space 118 between the wall 104 of the borehole 102 and an outer wall 120 of the casing 106. Looking at FIG. 1C, pumping is continued until the composition 116 fills the annular space 118 to a desired level 122 in the borehole 102 and the conduit 112 and packer 114 are removed (shown after equipment removal). Looking at FIG. 1D, the composition 116 cures to form a cured, epoxy-based zone isolation structure 124.

Referring now to FIGS. 2A-D, another embodiment of a zonal isolation procedure of this invention, generally 200, is shown to include well borehole section 202 having a wall 204 and including a casing string 206 extending through the section 202. Looking at FIG. 2B, the section 202 is shown equipped with a bottom zone isolation sealing member 208, outlets 210, and a supply conduit 212 including packers 214. An epoxy-based zonal isolation composition 216 of this invention is then pumped through the conduit 212 into an annular space 218 between the wall 204 of the section 202 above the member 208. Looking at FIG. 2C, pumping is continued until the composition 216 fills the annular space 218 to a desired level 220 in the section 202. The conduit 212 and packers 214 are then removed (shown after equipment removal). Looking at FIG. 2D, the composition 216 cures to form a cured, epoxy-based zone isolation structure 222 within the section 202.

Figures 3A, 3B, 3C, 3D:
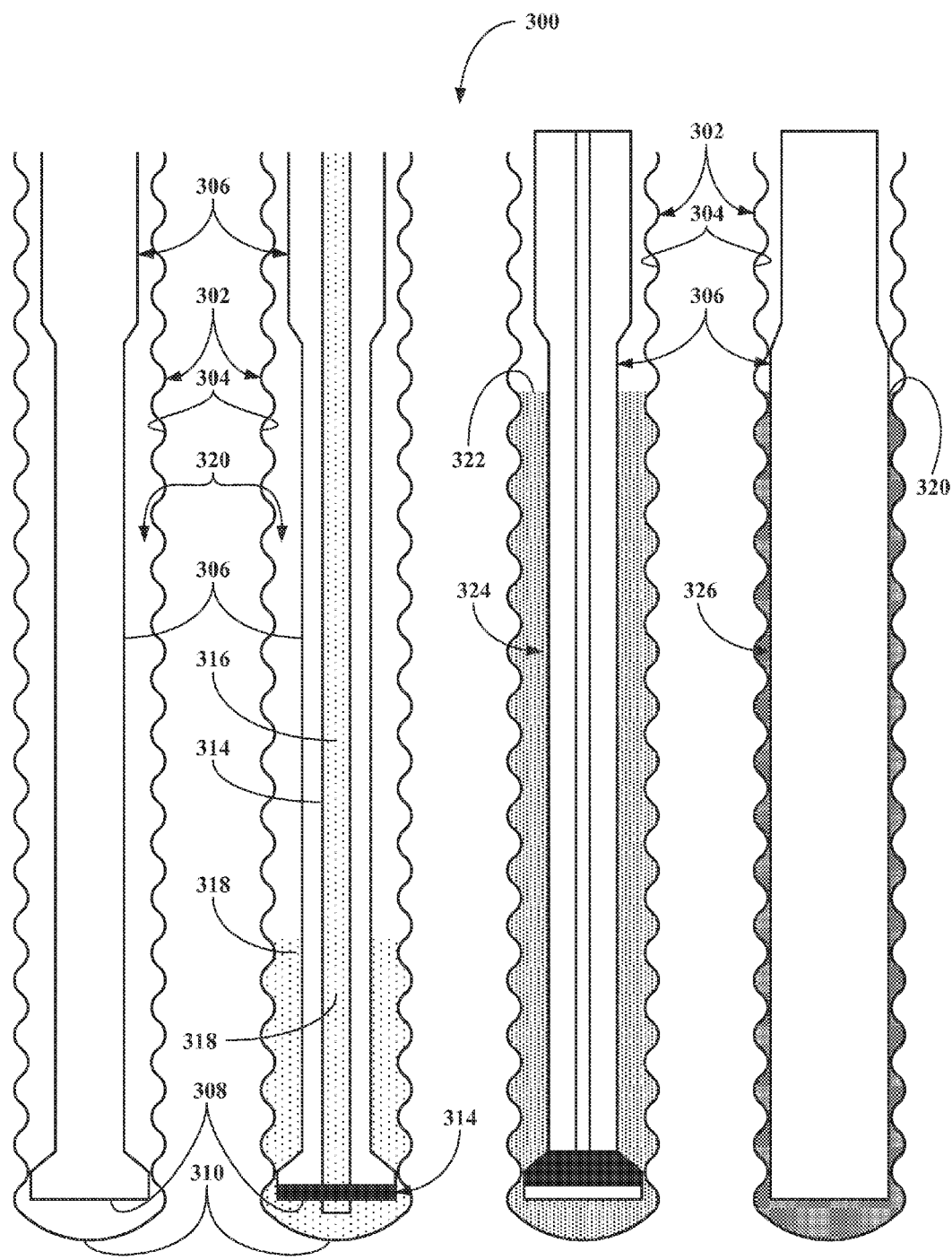
FIG. 3A depicts an annulus between a borehole and an expandable tubing.
FIG. 3B depicts the annulus of FIG. 3A isolating and filling a portion of the annulus with an epoxy zonal isolation composition of this invention.
FIG. 3C depicts the annulus of FIG. 3A after the portion has been filled with the epoxy zonal isolation composition and the composition has cured and expanded.
FIG. 3D depicts the zone of the annulus of FIG. 3A after the expansion tubing has been expanded and the composition compressed.
Figures 4A, 4B, 4C, 4D:
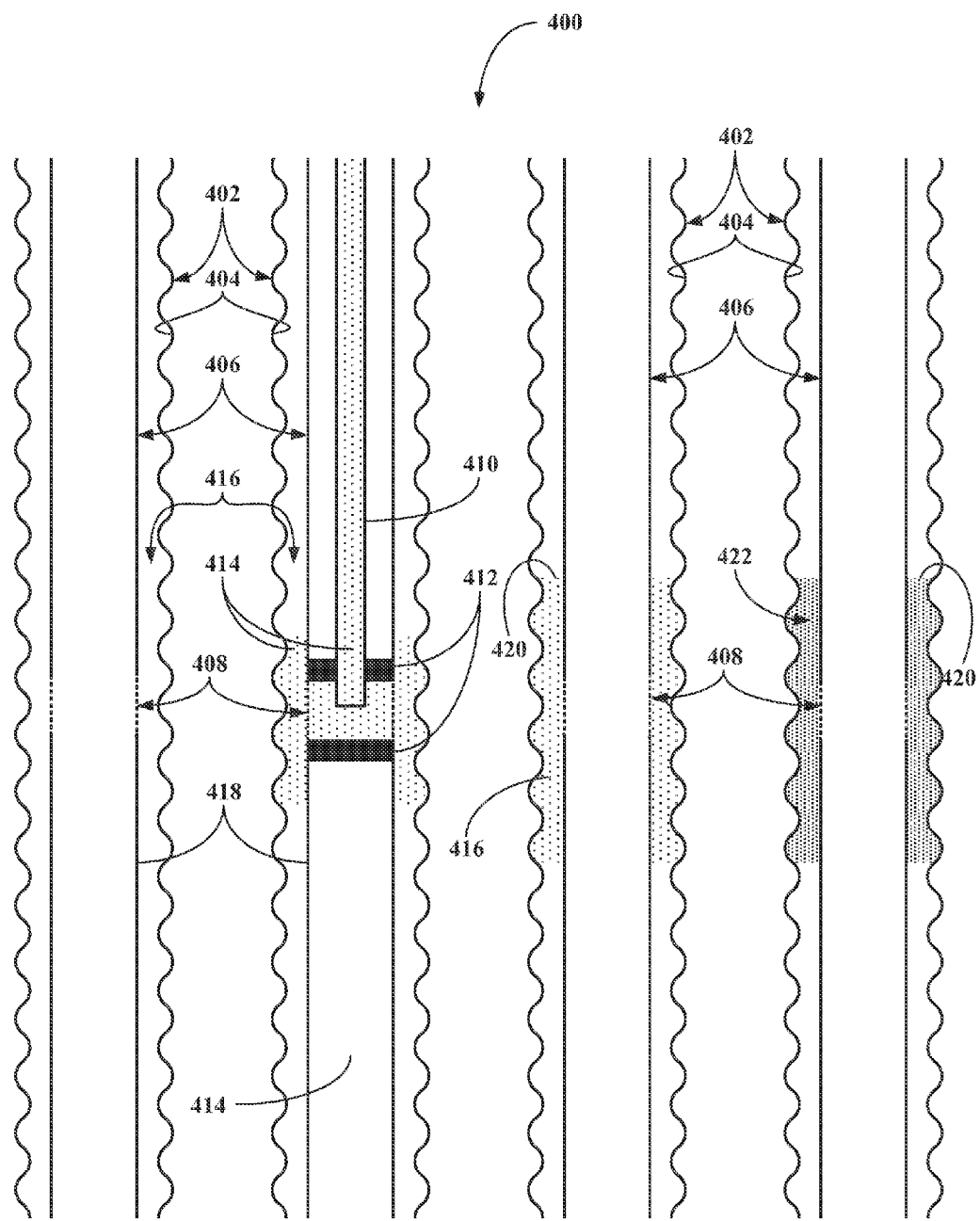
FIG. 4A depicts a borehole including a casing having a region through which production or other fluids may flow into the structure from a formation or into the formation from the region via an annulus.
FIG. 4B depicts the borehole of FIG. 4A after isolating the region and filling the annulus around the region with an epoxy composition of this invention.
FIG. 4C depicts the borehole of FIG. 4A after the annulus around the structure has been filled with the epoxy zonal isolation composition.
FIG. 4D depicts the borehole of FIG. 4A after the epoxy zonal isolation composition has cured and expanded.

Referring now to FIGS. 3A-D, an embodiment of an expansion tubing procedure of this invention, generally 300, is shown to include well borehole 302 having a wall 304 and including a casing string 306 extending through the borehole 302, where the casing 306 has a distal end 308 disposed near a bottom 310 of the borehole 302. The casing 306 also includes an expandable section 312. Looking at FIG. 3B, the borehole 302 is shown equipped with a supply conduit 314 including a packer 316. An epoxy-based zonal isolation composition 318 of this invention is then pumped through the conduit 314 into an annular space 320 between the wall 304 of the borehole 302. Pumping is continued until the composition 318 fills the annular space 320 to a desired level 322 in the borehole 302. The conduit 314 and packer 316 are then removed (not shown) and the composition 318 allowed to cure to form a cured, epoxy-based zone isolation structure 324 within the borehole 302. An expansion member 326 is then inserted into the casing 306 and the tubing is expanded by pulling the expansion member 326 through the expansion section 312 of the casing 306 to expand the expansion section 312. The expansion operation results in a compression of the cured, epoxy-based zone isolation structure 324 to form a compressed, cured, epoxy-based zone isolation structure 328 as shown in FIG. 3D. Additional details on expansion tubing, how it is expanded and used in downhole applications may be found in, published Apr. 1, 2010 and U.S. Pat. Nos. 3,049, 752, 3,678,560, 3,905,227, 4,204,426, 4,616,987, 5,271,469, 5,271,472, 5,947,213, 6,112,809, 6,296,057, 6,843,317, 6,880,632, 7,182,141, 7,215,125, 7,500,389, 7,634,942, and United States Published Application No. 20030111234, 20040099424, 20040154797, 20040163819, 20040216925, 20050173109, 20050173130, 20050279514, 20050279515, 20060027376, 20070151360, 20080083533 and 20100078166.

Referring now to FIGS. 4A-D, an embodiment of a squeeze out procedure of this invention, generally 400, is shown to include well borehole section 402 having a wall 404 and including a casing string 406 extending through the section 402. The section 402 includes a region 408 through which fluid flow into and out of the casing 406. This region 408 may result in contamination of production fluids, treating fluids, or other fluids typically used in downhole operations. To reduce or eliminate the flow of fluid through the region 408, a sealant of this invention can be pumped into the region 408, and after curing, the sealant will form a seal reducing or eliminating fluid flow into and out of the casing 406. Looking at FIG. 4B, the section 402 is shown equipped with a supply conduit 410 including packers 412. An epoxy-based zonal isolation composition 414 of this invention is then pumped through the conduit 410 into an annular space 416 between the wall 404 of the section 402 and an outer wall 418 of the casing 406. Looking at FIG. 4C, pumping is continued until the composition fills the annular space 416 to a desired level 420 in the section 402. The conduit 410 and packers 412 are then removed (shown after equipment removal). Looking at FIG. 4D, the composition 414 cures to form a cured, epoxy-based zone isolation structure 422 within the section 402 reducing or eliminating flow through the case 406 at the region 408.

EXPERIMENTS OF THE INVENTION

Example 1

This example illustrates the formulation of epoxy foam zonal isolation compositions for high temperature applications, where the composition has a set temperature in a high-temperature range between about 150° F. to about 300° F. and the compositions including 1 wt. %, 3 wt. %, 5 wt. %, 10 wt.

%, 15 wt. % and 20 wt. % added of p-toluenesulfohydrazide (TSH) or 4-methylbenzene p-toluenesulfohydrazide.

22.6 grams of DURA COAT™ 1A available from JACAM Chemicals, LLC, of Sterling, Kans. was added to 2.6 grams of AKOLIDINE™ 11 available from Lonza Group Ltd, Joseph Colleluori, Muenchensteinerstrasse 38, CH-4002 Basel, Switzerland and an indicated amount of p-toluenesulfohydrazide with mixing. To this solution was added 2.0 grams of DURA COAT™ 2B available from JACAM Chemicals, LLC, of Sterling, Kans. and placed in an oven @ 250° F. for 24 hr to form a high-temperature foam zonal isolation composition (HTFZIC) of this invention. Table I tabulates the components, the amount and weight percentages of the HTFZI compositions of this invention.

Table I

High-Temperature Zone Isolation Composition

TABLE I

High-Temperature Zone Isolation Composition

| Foams | DURA COAT ™ 1A | DURA COAT ™ 2B | AKOLIDINE ™ 11 | TSH* |
|---|---|---|---|---|
| F1 | 22.6 grams | 2.0 grams | 2.6 grams | 1 wt. % |
| F2 | 22.6 grams | 2.0 grams | 2.6 grams | 3 wt. % |
| F3 | 22.6 grams | 2.0 grams | 2.6 grams | 5 wt. % |
| F4 | 22.6 grams | 2.0 grams | 2.6 grams | 10 wt. % |
| F5 | 22.6 grams | 2.0 grams | 2.6 grams | 20 wt. % |

*p-toluenesulfohydrazide

The experimental data showed that F4 had the best foam properties of the tested compositions having a compressive strength between 3.318 and 5.704 psi. F5 was too exothermic and had reduced foam properties.

Example 2

This example illustrates the formulation of epoxy foam zonal isolation compositions for high temperature applications, where the composition has a set temperature in a high-temperature range between about 150° F. to about 300° F. and the compositions including 1 wt. %, 3 wt. %, 5 wt. %, 10 wt. %, 15 wt. % and 20 wt. % added of p-toluenesulfohydrazide (TSH) or 4-methylbenzene p-toluenesulfohydrazide.

Figure 5:
FIG. 5 depicts a photograph of a cured/foamed sealing composition of this invention.

5 wt. % and 10 wt. % of p-toluenesulfohydrazide were added to the formula of Example 1 base sample above and the final composition was placed in oven rolling cell at 250° F. under a pressure of 300 psi using a gas mixture including 96% nitrogen and 4% oxygen. After 24 hr of pressurization, the sample with 10 wt. % TSH showed better foam properties than the sample with 5 wt. % TSH. FIG. 5 illustrates the cured and foamed seal of this invention.

All references cited herein are incorporated by reference for every purpose permitted by controlling United States Laws. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for zone isolation comprising:
selecting a foamable epoxy-based composition comprising one epoxy resin or a plurality of epoxy resins, one hardening agent or a plurality of hardening agents, one blowing agent or a plurality of blowing agents based on a temperature of an annulus between a borehole and a tubing string, where the foamable epoxy-based composition comprises a foamable low temperature epoxy-based composition adapted to cure at a curing temperature between about 50° F. of to about 90° F., a foamable mid temperature epoxy-based composition between about 90° F. to about 150° F., or a foamable high temperature epoxy-based composition between about 150° F. to about 300° F. and where the low temperature, the mid temperature and the high temperature foamable epoxy-based compositions differ in amount of epoxy resins and amount and type of hardening agents,
pumping the epoxy-based composition into the annulus between the borehole and the tubing string, and
allowing the composition to cure and the blowing agent to decompose to form a foam zonal isolation structure having a Poisson ratio of less than or equal to about 0.5, where the composition is compressible and where the structure continues to expand after setting allowing the structure to intrude into surface cavities and crevices of the borehole and into formations penetrated by the borehole, while adhering to the outer surface of the tubing string resulting in improved sealing and improved sealing integrity of the structure.

2. The method of claim 1, further comprising:
prior to pumping, isolating a section of an annulus between the borehole and the tubing string so that the foam zonal isolation structure is located along a length of the tubing string.

3. The method of claim 1, further comprising:
during or after curing, expanding a section of the tubing string, where the compressibility of the cured foam structure is sufficient to allow expansion of tubing without substantial loss in seal integrity or zonal isolation.

4. The method of claim 1, wherein the zonal isolation structure is locate at a distal end of the borehole.

5. The method of claim 1, wherein the zonal isolation structure cures to form a cured foam epoxy composition having sufficient compressibility and resilience properties to permit compression of the composition without substantial loss in seal integrity or zonal isolation.

6. The method of claim 1, wherein the epoxy resins comprise: (a) glycidyl ethers epoxy resin prepared by the reaction of epichlorohydrin with a compound containing a hydroxyl group carried out under alkaline reaction conditions; (b) epoxy resins prepared by the reaction of epichlorohydrin with mononuclear di- and tri-hydroxy phenolic compounds; (c) epoxidized derivatives of natural oils with mixed long-chain saturated and unsaturated acids having between about 14 and 20 carbon atoms; (d) polyepoxides derived from esters of polycarboxylic acids with unsaturated alcohols; (e) polyepoxides derived from esters prepared from unsaturated alcohols and unsaturated carboxylic acids; (f) epoxidized butadiene based polymers; (g) epoxidized derivatives of dimers of dienes, and (h) mixtures or combinations thereof.

7. The method of claim 6, wherein the epoxy resins have a molecular weight between about 50 and about 10,000.

8. The method of claim 1, wherein the hardening agents for the high temperature foamable epoxy-based compositions comprise polyamine curing agents, alkoxylated polyamine curing agents, or mixtures and combinations thereof, wherein the hardening agents for the mid temperature and the low temperature foamable epoxy-based compositions comprise heterocylic amine curing agents.

9. The method of claim 8, wherein the hardening agents for the high temperature foamable epoxy-based compositions comprise alkoxylated aliphatic polyamines, alkoxylated cycloaliphatic polyamines, alkoxylated aromatic polyamines, alkoxylated heterocyclic polyamines or mixtures and combinations thereof.

10. The method of claim 9, wherein the hardening agents for the high temperature foamable epoxy-based compositions comprise alkoxylated N-alkyl- and N-alkylenyl-substituted 1,3-diaminopropanes or mixtures and combinations thereof.

11. The method of claim 9, wherein the aromatic heterocyclic amine hardening agents for the mid temperature and the low temperature foamable epoxy-based compositions comprise pyrrolidine, alkyl pyrrolidines, oxazoline, alkyl oxazolines, triazoles, alkyl triazoles, pyrazolidine, alkyl pyrazolidine, piperidine, alkyl piperidines, piperazine, alkyl piperazines, imidazoline, imidazolidine, alkyl imidazolidines, azepane, alkyl azepane, azepine, alkyl azepines, morpholine, alkyl morpholines, diazapines, alkyl diazapines, or mixtures and combinations thereof.

12. The method of claim 11, wherein the aromatic heterocyclic amine hardening agents for the mid temperature and the low temperature foamable epoxy-based compositions comprise alkyl pyridines and an ethoxylated N-tallow-1,3-diaminopropane, where the degree of ethoxylation is approximately 10 moles ethoxylate per mole of tallow diamine.

13. The method of claim 1, the epoxy-based composition further comprises a solvent system, where the solvent system comprises aromatic solvents and heterocyclic aromatic solvents or mixtures and combinations thereof.

14. The method of claim 13, wherein the high temperature foamable epoxy-based compositions comprise from about 60 wt. % to about 85 wt. % of the epoxy resins, from about 1 wt. % to about 15 wt. % of the hardening agents, from about 39 wt. % to about 0 wt. % of the solvent system, and from about 5 wt. % to about 15 wt. % the blowing agents based on the weight of the other components, where the solvent system reduces the viscosity of the composition for ease of pumping, wherein the mid temperature foamable epoxy-based composition comprises from about 70 wt. % to about 50 wt. % of an epoxy resin or mixture of epoxy resins, from about 30 wt. % to about 50 wt. % of a curing agent or a mixture of curing agents, from about 5 wt. % to about 15 wt. % a blowing agent or mixture of blowing agents, and up to about 20 wt. % of a or solvent system and wherein the low-temperature zonal isolation composition comprises from about 75 wt. % to about 99 wt. % of an epoxy resin or a mixture of epoxy resins, from about 25 wt. % to about 1 wt. % of a curing agent or a mixture of curing agents, from about 5 wt. % to about 20 wt. % the blowing agents and up to about 20 wt. % of a solvent system.

15. The method of claim 14, wherein the epoxy resins comprise glycidyl ethers epoxy resins, the high temperature hardening agents comprise alkoxylated polyamines, the mid temperature and low temperature hardening agents comprises heterocylic amines, the blowing agents comprise aryl hydrazides and the solvent system comprises an aromatic heterocyclic solvent or mixture of aromatic heterocyclic solvents.

16. The method of claim 14, wherein the epoxy resin comprise a glycidyl ethers epoxy resin prepared by the reaction of epichlorohydrin with a compound containing a hydroxyl group carried out under alkaline reaction conditions, the high temperature hardening agent comprises an ethoxylated N-tallow-1,3-diaminopropane, where the degree of ethoxylation is approximately 10 moles ethoxylate per mole of tallow diamine, the mid temperature and low temperature hardening agents comprises heterocylic amines, the solvent system comprises a mixture of alkyl pyridines and the blowing agent comprises p-toluenesulfohydrazide, 4-methylbenzene p-toluenesulfohydrazide or mixtures thereof.

* * * * *